United States Patent
Sutardja et al.

(10) Patent No.: US 7,737,666 B2
(45) Date of Patent: Jun. 15, 2010

(54) SPLIT GATE DRIVE SCHEME TO IMPROVE RELIABLE VOLTAGE OPERATION RANGE

(75) Inventors: Sehat Sutardja, Los Altos Hills, CA (US); Jianchen Zhang, Los Altos Hills, CA (US); Sofjan Goenawan, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 713 days.

(21) Appl. No.: 10/744,982

(22) Filed: Dec. 22, 2003

(65) Prior Publication Data

US 2005/0030770 A1    Feb. 10, 2005

Related U.S. Application Data

(60) Provisional application No. 60/492,403, filed on Aug. 4, 2003.

(51) Int. Cl.
*G05F 1/10* (2006.01)
*G05F 1/652* (2006.01)

(52) U.S. Cl. .................. 323/222; 323/224; 323/282; 323/284

(58) Field of Classification Search .............. 323/222, 323/224, 282, 284, 274
See application file for complete search history.

(56) References Cited

U.S. PATENT DOCUMENTS

3,714,466 A * 1/1973 Spence .................. 327/328
4,336,466 A * 6/1982 Sud et al. ............... 327/537

(Continued)

FOREIGN PATENT DOCUMENTS

EP    1028528    8/2000

(Continued)

OTHER PUBLICATIONS

European Search Report dated Oct. 25, 2006 from corresponding EP application No. 04009304.9.

(Continued)

*Primary Examiner*—Bao Q Vu

(57) ABSTRACT

Systems and techniques for efficient power regulators with improved reliability. A power regulator may include a first driver including a first switch and a second switch, where a power dissipation of the first switch is less than a power dissipation of the second switch. The power regulator may include a second driver. The first and second switches may be implemented as transistors, which may have different on-state breakdown voltages and/or on-state drain source resistances.

57 Claims, 8 Drawing Sheets

U.S. PATENT DOCUMENTS

| | | | |
|---|---|---|---|
| 5,204,809 A | 4/1993 | Andresen | |
| 5,416,387 A * | 5/1995 | Cuk et al. | 315/209 R |
| 5,570,276 A * | 10/1996 | Cuk et al. | 363/16 |
| 5,998,977 A * | 12/1999 | Hsu et al. | 323/272 |
| 6,215,288 B1 * | 4/2001 | Ramsey et al. | 323/224 |
| 6,249,111 B1 * | 6/2001 | Nguyen | 323/282 |
| 6,310,468 B1 * | 10/2001 | Feldtkeller | 323/282 |
| 6,353,309 B1 * | 3/2002 | Ootani et al. | 323/282 |
| 6,362,986 B1 | 3/2002 | Schultz et al. | |
| 6,529,056 B1 * | 3/2003 | You et al. | 327/170 |
| 6,563,294 B2 * | 5/2003 | Duffy et al. | 323/283 |
| 6,583,644 B2 * | 6/2003 | Shin | 326/26 |
| 6,806,692 B2 * | 10/2004 | Lee | 323/277 |
| 6,930,473 B2 * | 8/2005 | Elbanhawy | 323/282 |
| 2003/0038615 A1 | 2/2003 | Elbanhawy | |

FOREIGN PATENT DOCUMENTS

| | | |
|---|---|---|
| EP | 1172923 | 1/2002 |
| JP | 07-222438 | 8/1995 |
| JP | 2002-064975 | 2/2002 |
| JP | 2004-088820 | 3/2004 |

OTHER PUBLICATIONS

Chinese Office Action dated Sep. 1, 2006, received in Chinese Patent Application No. 200410042854.2 (corresponding to U.S. Appl. No. 10/744,982) (human translation included); Document to be published by USPTO.

* cited by examiner

SPLIT GATE DRIVE SCHEME TO IMPROVE RELIABLE VOLTAGE OPERATION RANGE

CROSS-REFERENCE TO RELATED APPLICATIONS

The present application claims priority to commonly assigned U.S. Provisional Patent Application No. 60/492,403, filed on Aug. 4, 2003, entitled "A Driver Scheme for Improved Reliability of High Efficiency, High Current Switched Regulator," which is hereby incorporated by reference in its entirety.

TECHNICAL FIELD

This invention relates to power regulators such as DC/DC converters.

BACKGROUND

Direct current to direct current (DC/DC) converters generally include an upper driver portion and a lower driver portion to deliver current to a load via an external inductor and an external capacitor.

For example, FIG. 1 shows a DC/DC converter system 100 in a step-down configuration known as a "buck" configuration. A pulse width modulator (PWM) controller 110 controls an upper driver incorporating a PMOS transistor 120 and a lower driver incorporating an NMOS transistor 130. Transistors 120 and 130 are commonly implemented using power transistors. A load 140 may be coupled with the output of transistor 120 and transistor 130 via an inductor 150 and a capacitor 160. System 100 also includes parasitic inductances $L_1$ and $L_2$, which may be caused by the inductance of the packaging, printed circuit board traces, finite equivalent series inductance (ESL) of an external decoupling capacitor such as capacitor 180, or other factors. In operation, PWM controller 110 turns transistor 120 and transistor 130 on and off alternately, so current flows through current path $I_1$, and current path $I_2$ alternately.

The configuration shown in FIG. 1 may not be optimal for high current applications, since PMOS power transistors generally have a relatively large on-state drain/source resistance $R_{DS\text{-}on}$. For example, $R_{DS\text{-}on}$ for a PMOS power transistor is generally about two to three times higher than the $R_{DS\text{-}on}$ value of a comparably sized NMOS power transistor. To achieve a comparable value of $R_{DS\text{-}on}$, the size of the PMOS power transistor would need to be increased. However, larger devices experience an increased gate switching loss and may lead to undesirably large die sizes.

Alternately, NMOS power transistors may be used for both the upper and lower drivers. FIG. 2A shows such an alternate implementation. A DC/DC converter system 200 includes a PWM controller 210 to control an upper driver including a top NMOS transistor 220 and a bottom NMOS transistor 230. System 200 also includes a bootstrap pre-driver 215 and a bootstrap capacitance $C_{BS}$ 218 in communication with top transistor 220.

Because of the lower value of $R_{DS\text{-}on}$ for NMOS transistors relative to comparable PMOS transistors, the implementation shown in FIG. 2A may provide higher efficiency performance than the implementation of FIG. 1. However, the addition of the bootstrap pre-driver increases the complexity of the system. If NMOS transistor 220 is integrated, the on-state breakdown voltage of NMOS transistor 220 may be too low for higher current applications, or the reliable input voltage operating range may have to be decreased.

For example, FIG. 2B shows typical 5V NMOS transistor breakdown and snap back behavior for a number of values of $V_{GS}$. In contrast, FIG. 2C shows typical 5V PMOS transistor breakdown behavior for the same values of $V_{GS}$. An NMOS transistor can handle large $V_{DS}$ when its gate voltage is low or the transistor is off. As FIG. 2C illustrates, PMOS transistors are typically better able to handle on-state stress than comparable NMOS transistors.

SUMMARY

In general, in one aspect, a power regulator includes a first driver with a first driver output and a second driver with a first driver output. The first driver may include a first switch with an output terminal in communication with the first driver output and a second switch with an output terminal in communication with the first driver output. The power dissipation of the first switch may be less than the power dissipation of the second switch. For example, the first switch and the second switch may be implemented using transistors, with the first switch having a lower power dissipation than the second switch due to its transistor type or size.

An on-state breakdown voltage of the second switch may be greater than an on-state breakdown voltage of the first switch. For example, the first switch and the second switch may be implemented using transistors, with the second switch having a greater on-state breakdown voltage than the first switch due to its transistor type or size.

In some implementations, the first switch may comprise an NMOS transistor, and the regulator may further include a bootstrap pre-driver in communication with a gate of the first transistor.

In some implementations, the regulator may include circuitry to turn off the first driver. The circuitry may be configured to turn off the first driver by controlling a first turnoff initiation time and a first slew rate of a voltage applied to a gate of the first transistor. The circuitry may further be configured to control a second turnoff initiation time and a second slew rate of a voltage applied to a gate of the second transistor.

The circuitry may be configured to control the first turnoff initiation time to be before the second turnoff initiation time. The circuitry may be configured to control the first slew rate to be greater than the second slew rate. The circuitry may be configured to control the first turnoff initiation time, the second turnoff initiation time, the first slew rate, and the second slew rate so that the first transistor is turned off prior to the second turnoff initiation time.

The regulator may be included in a direct current to direct current (DC/DC) converter. The regulator may include a filter with an input in communication with the first driver output and the second driver output. The filter may be in communication with a load.

The first driver may further include one or more additional switches, each having an output terminal in communication with the first driver output. The second driver may include one or more second driver switches each having an output terminal in communication with the second driver output. The second driver switches may include NMOS transistors. The one or more second driver switches may include a first transistor and a second transistor, the first transistor having an on-state drain source resistance lower than an on-state drain source resistance of the second transistor. The first transistor may have an on-state breakdown voltage lower than an on-state breakdown voltage of the second transistor.

In general, in another aspect, a power regulator may include a first driving means including a first driver output means. The first driving means may include a first switching means with an output means in communication with the first driver output means, and may include a second switching means with an output means in communication with the first driver output means. A power dissipation of the first switching means may be less than a power dissipation of the second switching means.

In general, in another aspect, a method may include turning off a first switch of a driver, the first switch having a lower power dissipation in the on-state than a second switch of the driver, and turning off a second switch of the driver. The first switch may include a first transistor, and turning off the first switch of the driver may comprise modifying a voltage applied to a gate of the first transistor from an on voltage at which the first transistor is on to an off voltage at which the first transistor is off.

The second switch may comprise a second transistor, and turning off the second switch of the driver may comprise modifying a voltage applied to a gate of the second transistor from an on voltage at which the second transistor is on to an off voltage at which the second transistor is off.

Modifying the voltage applied to the gate of the first transistor may be performed over a time equal to a first transistor turn off time, while modifying the voltage applied to the gate of the second transistor may be performed over a time equal to a second transistor turn off time. The second transistor turn off time may be greater than the first transistor turn off time. For example, the second transistor turn off time may be at least two times as long as the first transistor turn off time.

The method may further include turning on a different driver. Turning on the different driver may comprise turning on one or more switches included in the different driver. The one or more switches may be implemented as transistors. The method may further include turning off the different driver. In an implementation, the different driver comprises a first transistor and a second transistor, and turning off the different driver comprises turning off the first transistor prior to turning off the second transistor. The first transistor may have a lower dissipation in the on state than the second transistor. The first transistor may have a lower breakdown voltage in the on state than the second transistor.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Systems and techniques described herein may allow for efficient power regulators with improved reliability.

Figure 1:
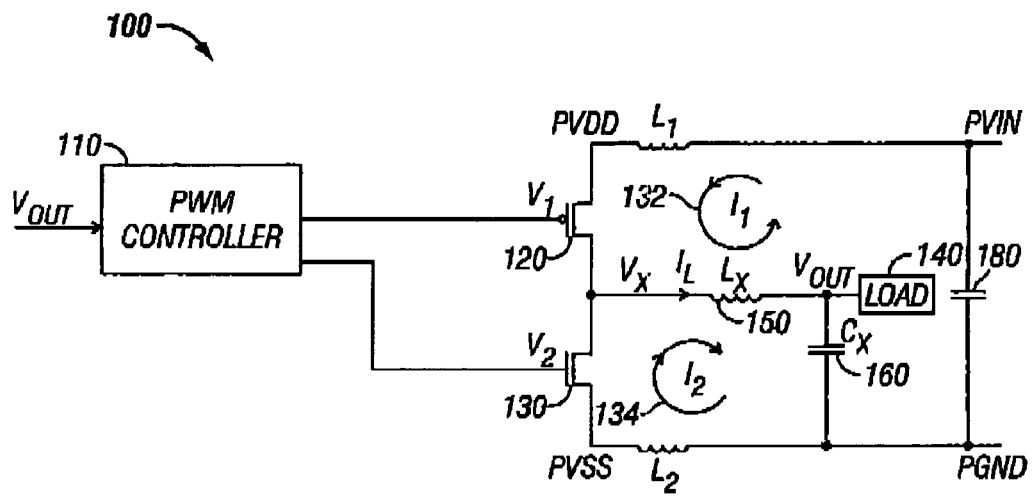
FIG. 1 is schematic of a DC/DC converter according to the prior art.
Figure 2A:
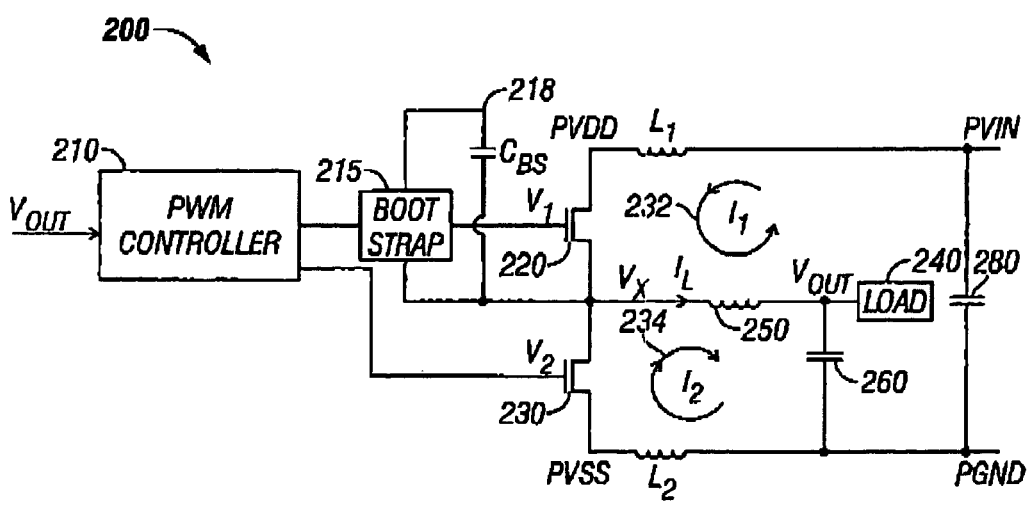
FIG. 2A is a schematic of another DC/DC converter according to the prior art.
Figure 2B:
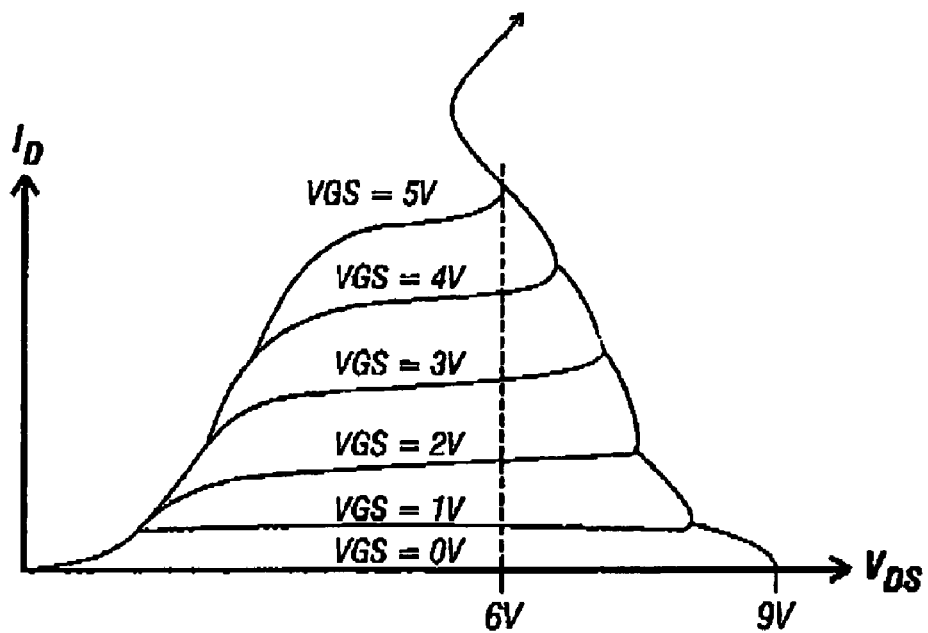
FIG. 2B illustrates typical 5V NMOS transistor breakdown and snap back behavior.
Figure 2C:
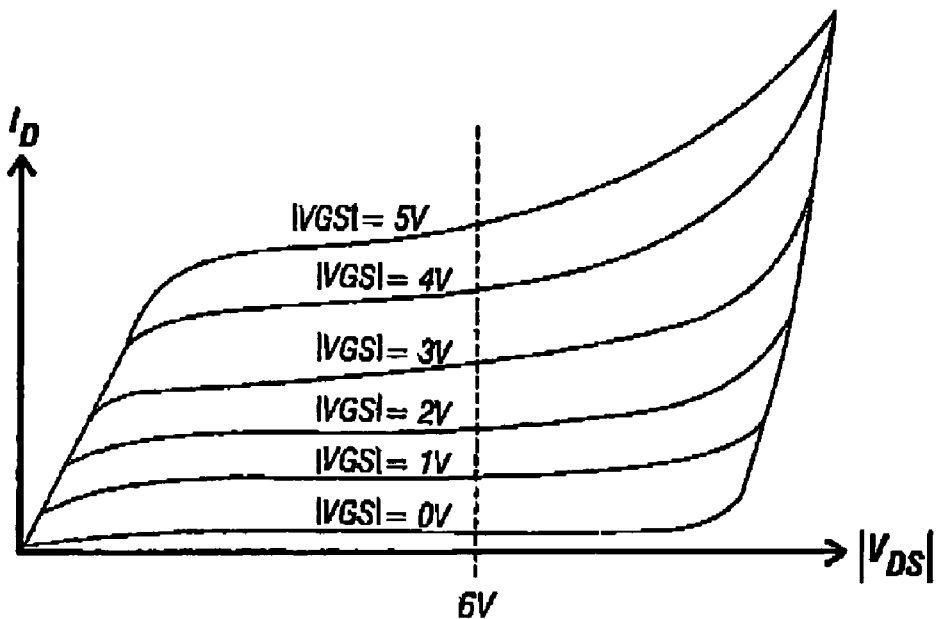
FIG. 2C illustrates typical 5V PMOS transistor breakdown behavior.

DC/DC converters such as those shown in FIGS. 1 and 2A may have a number of limitations. For example, for integrated DC/DC converters, internal voltage bouncing (caused by over- and under-shooting of PVDD and PVSS) may lead to undesirable noise, and may over-stress the constituent transistors. Voltage bouncing may stress transistor 220 particularly, which may experience values of $V_{DS}$ that are greater than the input voltage by about 2 V. The excessive stress on transistor 220 may limit the reliable input voltage operation range of system 200.

Voltage bouncing may occur primarily due to parasitic inductances such as inductance $L_1$ and inductance $L_2$ of FIG. 2A. Converter 200 of FIG. 2A may be in one of three states. In a first state, transistor 220 is on and transistor 230 is off. $V_x$ is high, the current through inductor 250 is increasing, and capacitor 280 is being charged. In a second state, transistor 220 is off and transistor 230 is on. $V_x$ is low and the current through inductor 250 is decreasing. In a third state, both transistor 220 and transistor 230 are off. The third state occurs during the transition between the first state and the second state. Time spent in the third state is often referred to as dead time.

Figure 6:
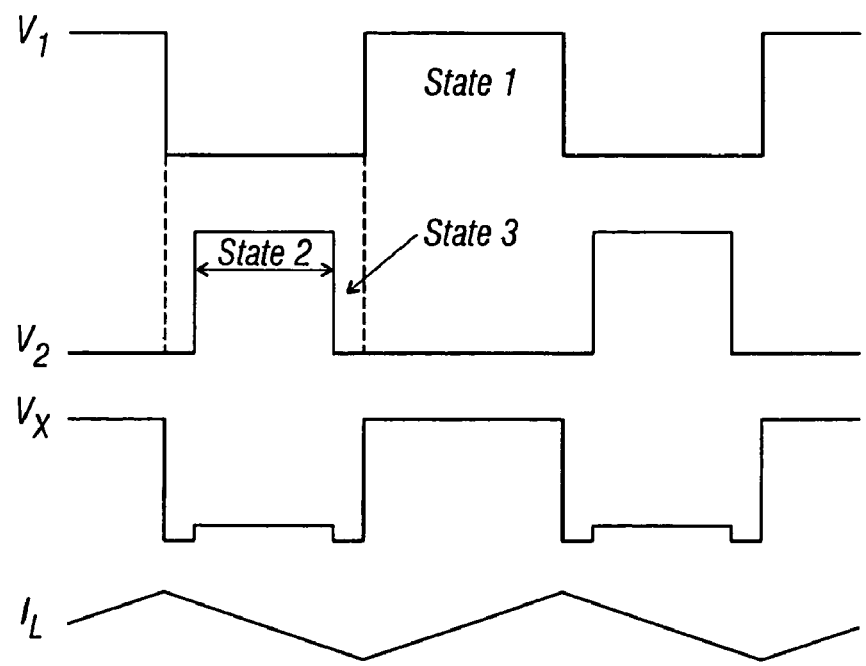
FIG. 6 shows voltages $V_1$, $V_2$, $V_x$, and current $I_L$ for a DC/DC converter such as that illustrated in FIG. 2A.

FIG. 6 illustrates the voltage $V_1$ at the gate of transistor 220, the voltage $V_2$ at the gate of transistor 230, the voltage $V_x$ at the common terminal of transistors 220 and 230, and the current through inductor 250 of FIG. 2A.

During the transition between the first state and the second state, current flow switches between current path 232 and current path 234. PVDD and PVSS may experience overshooting or under-shooting with respect to external power supply voltages PVIN and PGND primarily due to parasitic inductances $L_1$ and $L_2$.

Overshoot and undershoot may occur as follows. During the first state, the current through inductor 250 is increasing to a peak current $I_p$ before transistor 220 is turning off. This current flows through parasitic inductance $L_1$, and so as transistor 220 is turned off, a voltage $L_1 \, dI_1/dt$ is generated, opposing the change in the current through $L_1$. Similarly, a voltage $L_2 \, dI_2/dt$ is generated opposing the change in the current through $L_2$ (note that before transistor 230 is turned on, the current through $L_2$ is conducted through the body diode of transistor 230).

The current changes through parasitic inductances $L_1$ and $L_2$ may occur over times on the order of a few or tens of nanoseconds, with current change rates on the order of amps per nanosecond. Thus, during the transition from the first state to the second state, PVDD may overshoot PVIN by as much as $L_1|dI_1/dt|$. Similarly, PVSS may undershoot PGND by as much as $L_2|dI_2/dt|$. As noted above, before transistor 230 is turned on, the current through $L_2$ is conducted through the body diode of transistor 230, so $V_x$ may under-shoot by as much as $V_D+L_2 \, dI/dt$, where $V_D$ is the body diode forward on voltage.

A number of methods may be used to reduce the bouncing voltage. Parasitic inductances $L_1$ and $L_2$ may be reduced by improving the packaging and the printed circuit board layout, and by reducing the ESL of the decoupling capacitor. However, doing so may add significant cost to the systems.

Figure 7:
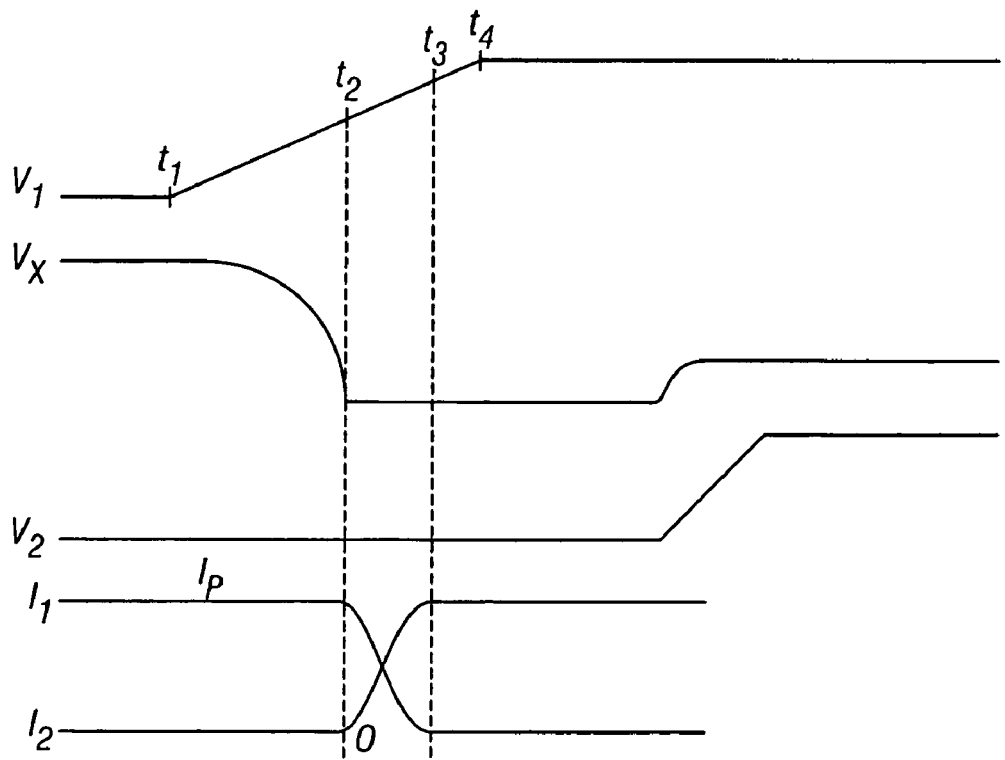
FIG. 7 shows voltages $V_1$, $V_2$, $V_x$, and I for a DC/DC converter such as that shown in FIG. 1, where a gate voltage of a transistor is increased slowly and dI/dt is still large.

Other methods include reducing the gate drive voltage slew rate to increase the time over which the current through the parasitic inductances. changes (and thus reducing the corresponding dI/dt). However, this method may significantly increase the dead time. Referring to FIGS. 7 and 1, if the voltage to the gate of transistor 120 is increased slowly, there is almost no effect on the current through inductance $L_1$ until $t_2$, the point at which $V_x$ drops below PVSS (e.g., ground). Between $t_2$ and $t_3$, the current through inductance $L_1$ is reduced from $I_p$ to zero and the current through inductance $L_2$ is increased from zero to $I_p$. As FIG. 7 shows, reducing the gate drive voltage slew rate only affects approximately ¼ of the switching time. Thus, a relatively small reduction in dI/dt is obtained for a relatively large increase in dead time. Further, since the transistors are operated in the high $R_{DS-on}$ region during the dead time, the efficiency of the converter is reduced.

The current inventors recognized that power regulators incorporating multiple switches for one or more of the upper or lower drivers may provide a better solution than existing systems. For example, multiple switches may be used to reduce or eliminate the problems due to power supply overshoot and undershoot outlined above.

Figure 3:
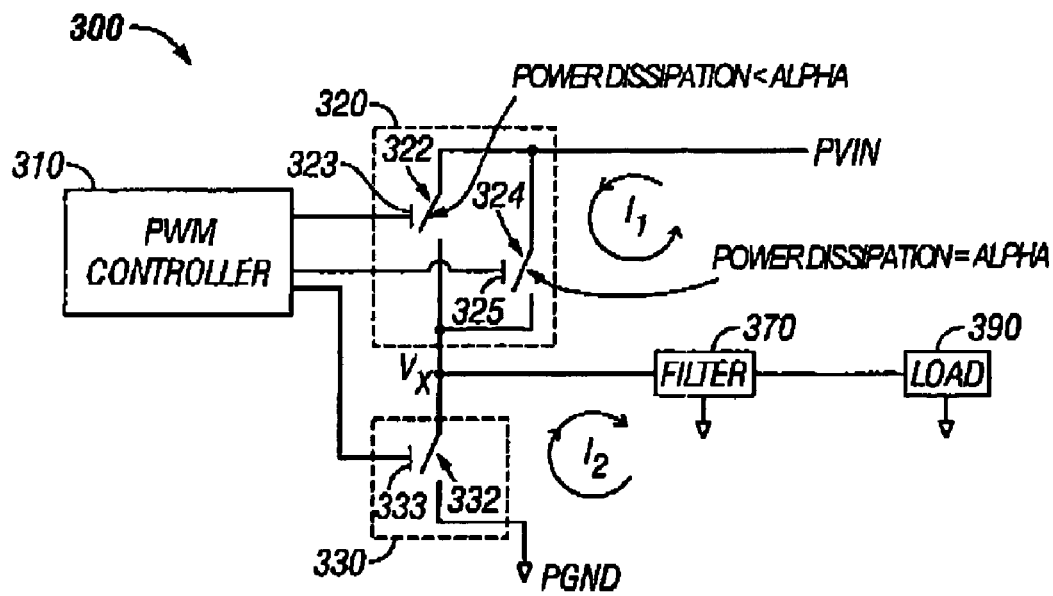
FIG. 3 is a schematic of a power regulator according to an implementation.

FIG. 3 shows a power regulator according to an embodiment. A DC/DC converter 300 includes a PWM controller 310 in communication with an upper driver 320 and a lower driver 330. Upper driver 320 includes a first switch 322 and a second switch 324. PWM controller 310 controls first switch 322 via a switch terminal 323 and controls second switch 324 via a switch terminal 325. Lower driver 330 includes a switch 332. PWM controller 310 controls switch 332 via a switch terminal 333. PWM controller 310 controls first switch 322, second switch 324, and switch 332 to generate current $I_1$ and $I_2$ alternately to provide a direct current output to a load 390 via a filter 370.

Providing multiple switches in upper driver 320 may provide a number of benefits. For example, first switch 322 may be more efficient (e.g., have a lower power dissipation) than second switch 324, while second switch 324 may have a higher on-state breakdown voltage. System 300 may be implemented so that first switch 322 carries most of the current $I_1$, but second switch 324 experiences the most significant on-state voltage stress. Thus, system 300 may be both efficient and reliable.

Figure 4:
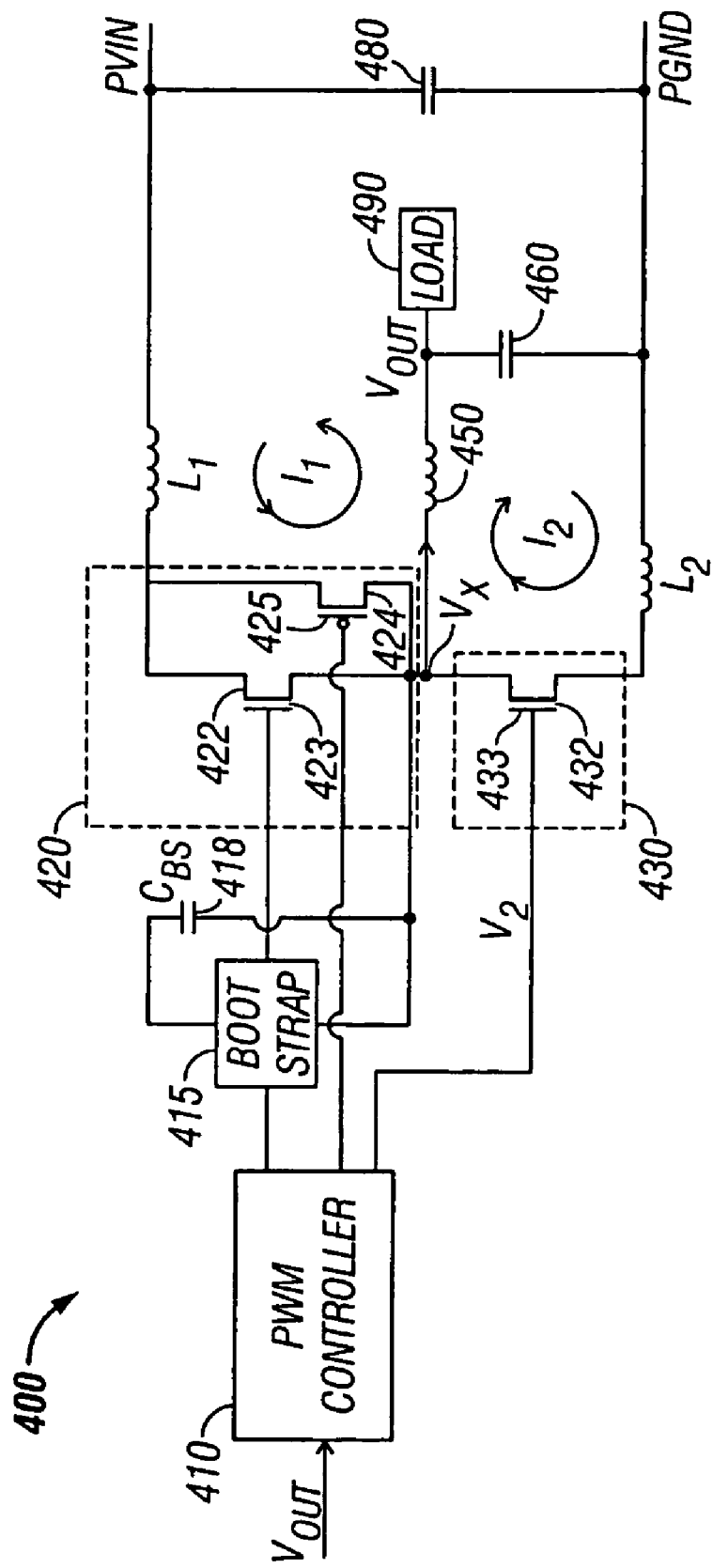
FIG. 4 is a schematic of an implementation of a DC/DC converter system incorporating both NMOS and PMOS transistors in a top switch.

In some implementations, first switch 322 and second switch 324 may be implemented as power transistors. FIG. 4 shows an implementation of a DC/DC converter system 400 where a first switch of an upper driver 420 is implemented as an NMOS transistor 422 and a second switch is implemented as a PMOS transistor 424. In some implementations, transistor 422 is larger than transistor 424, so that during the bulk of the duty cycle of upper driver 420, transistor 422 carries the majority of the current. The optimum sizes of transistor 422 and transistor 424 and associated $R_{DS-on}$ values are process dependent. In some implementations, transistor 422 may be configured to carry between about 70% and about 95% of the current, although other implementations are possible. Converter 400 includes a bootstrap pre-driver 415 and a bootstrap capacitor $C_{BS}$ 418 in communication with a gate 423 of transistor 422.

Converter 400 includes a PWM controller 410 to control the duty cycle of upper driver 420 and lower driver 430 (e.g., to turn transistor 422, transistor 424 and transistor 432 on and off at the desired times and with the desired slew rates).

Figure 5:
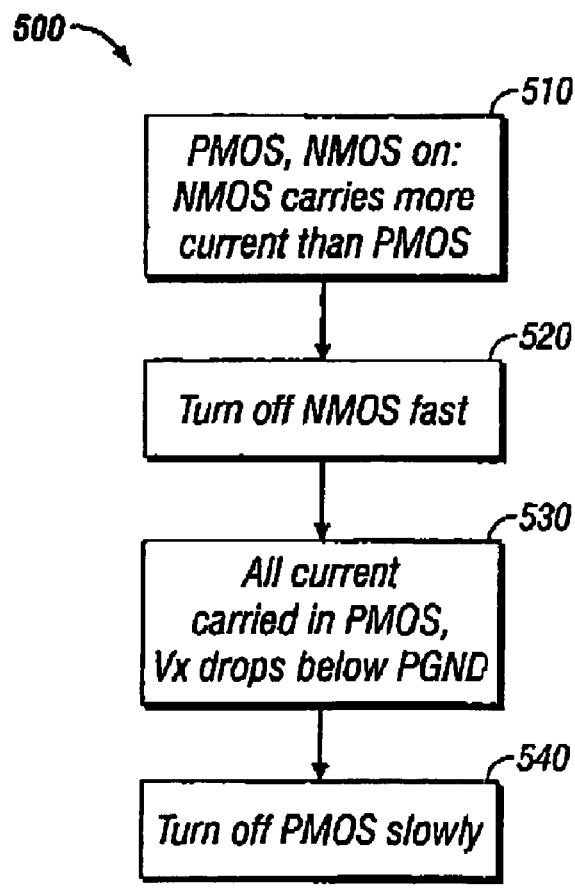
FIG. 5 illustrates a method to turn off a driver of a DC/DC converter system such as the system shown in FIG. 4.

As noted above, NMOS transistors may be less able to withstand voltage stress in the on state than PMOS transistors, due to a lower on-state breakdown voltage. In converters such as converter system 200 of FIG. 2A, the highest voltage stress on the upper driver occurs when the current is being switched from the upper driver to the lower driver. In an implementation, the reliability of converter system 400 may be improved by switching off upper driver 420 as illustrated in method 500 of FIG. 5.

Prior to turning off upper driver 420, NMOS transistor 422 (with lower $R_{DS-on}$) carries the majority of the current (510). For example, transistor 422 may carry about 90% of the current while transistor 424 carries about 10% of the current. In order to turn off upper driver 420, NMOS transistor 422 may first be turned off relatively quickly (520). Subsequently, all current in upper driver 420 is being carried by PMOS transistor 424 (530). PMOS transistor 424 is then turned off relatively slowly (540). Turning off transistor 422 relatively quickly reduces the contribution to the dead time related to turning off transistor 422. However, since $I_1$ does not change significantly when transistor 422 is turned off, voltage bouncing does not unduly stress transistor 422 in its on state.

Turning off transistor 424 relatively slowly increases the time over which the current $I_1$ changes. Thus, voltage bouncing is reduced. Further, since PMOS transistor 424 has an appreciably higher breakdown voltage in the on state than NMOS transistor 422, it is better able to withstand voltage transients without breakdown.

As a result, converter 400 may be more reliable than converter 200. However, since NMOS transistor 422 (which has a lower value of $R_{DS-on}$) carries the majority of the current during most of the duty cycle of the upper driver, the efficiency of converter 400 may not be unduly compromised.

Figure 8:
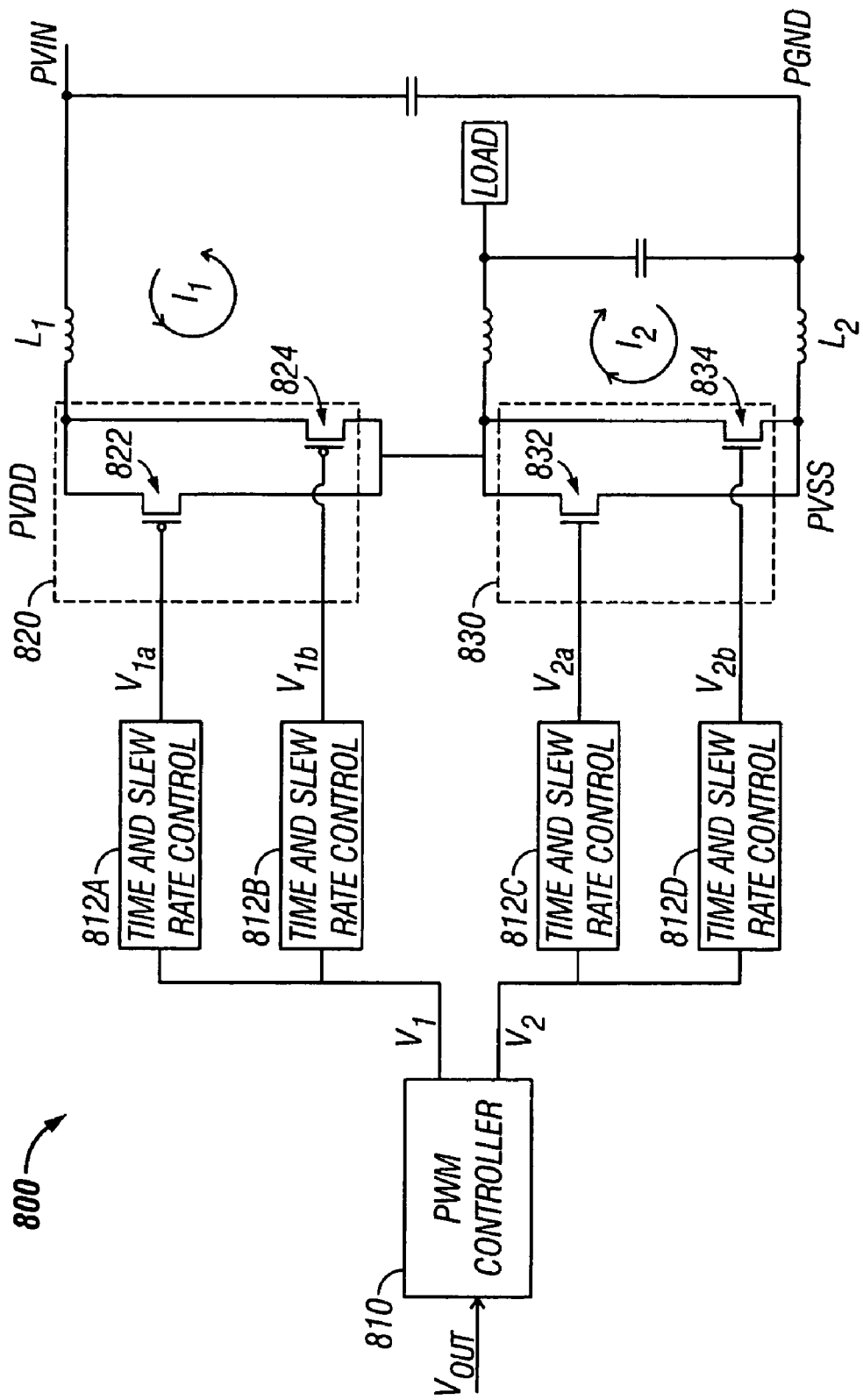
FIG. 8 shows an implementation of a DC/DC converter system to reduce or eliminate over- and under-shoot.

Another implementation of a power regulator with an upper and/or lower driver including multiple switches is shown in FIG. 8. FIG. 8 shows a DC/DC converter system 800 with an upper driver 820 including a first PMOS transistor 822 and a second PMOS transistor 824. Note that in some implementations, both first transistor 822 and second transistor 824 may be implemented as NMOS transistors. $R_{DS-on}$ of first transistor 822 is less than $R_{DS-on}$ of second transistor 824, where the optimal relative values of $R_{DS-on}$ for transistors 822 and 824 is process dependent. In an exemplary implementation, the ratio of the value of $R_{DS-on}$ for transistor 822 to the value of $R_{DS-on}$ for transistor 824 is about 1 to 9.

System 800 further includes time and slew rate controllers 812A through 812D (referred to generally as controllers 812). Controllers 812 are used to control the timing and rate of change of the voltage applied to the gates of transistors 822, 824, 832, and 834. Controllers 812 are shown separate from PWM controller 810 in FIG. 8; however, they may be integrated with PWM controller 810.

Figure 9:
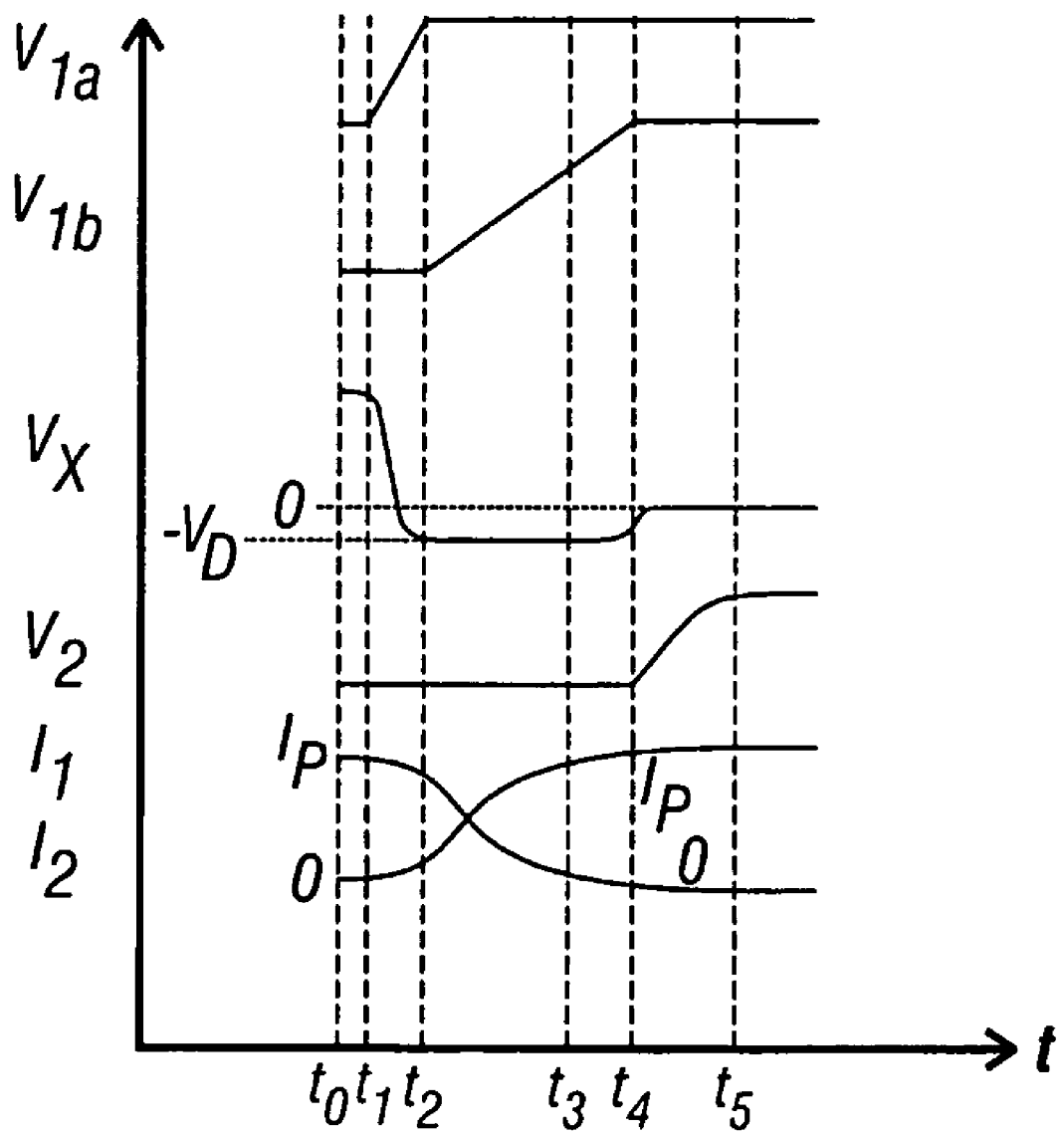
FIG. 9 shows voltages $V_{1a}$, $V_{1b}$, $V_x$, $V_2$, and currents $I_1$ and $I_2$ for an implementation such as that shown in FIG. 8.

Upper driver 820 and lower driver 830 may be turned off and on as described below, so that over- and under-shooting of PVDD and PVSS is reduced or eliminated. FIG. 9 shows $V_{1a}$, $V_{1b}$, $V_x$, and $I_1$ from a time $t_o$ prior to turning off upper driver 820 to a time $t_5$ when lower driver 830 is turned on.

From $t_0$ to $t_1$, upper driver 820 is on, with the majority of the current flowing through transistor 822 (with a lower value of $R_{DS-on}$). To turn off upper driver 820, time and slew rate controller 812A first turns off transistor 822 by increasing the voltage $V_{1a}$ at the gate of transistor 822 as shown over a time period from $t_1$ to $t_2$.

As FIG. 9 illustrates, $V_x$ drops to a voltage below zero volts very quickly. Controller 812B then turns off transistor 824 slowly by increasing the voltage $V_{1b}$ at the gate of transistor 824 over the time period from $t_2$ to $t_4$.

As FIG. 9 shows, $I_1$ and $I_2$ change from $I_p$ to zero and zero to $I_p$ (respectively) over a time period from $t_2$ to $t_3$.

The method described above may be used to effectively reduce dI/dt through the parasitic inductances (and thus reduce or eliminate over- and under-shoot problems in systems such as system 800) by allowing the current to change from $I_p$ to zero over the time between $t_2$ and $t_3$. However, the method does not lead to a large increase in the dead time, since the transition time between $t_1$ and $t_2$ (the time over which $V_x$ decreases to zero) is much smaller than that achieved using available systems.

At time $t_4$, lower driver 830 may be turned on. Since $I_2$ increases to $I_p$ prior to turning on lower driver 830 (it is conducted through the body diode of transistor 832 and/or transistor 834), controllers 812C and 812D may turn on transistors 832 and 834 at the same time. In other implementations, controllers 812C and 812D may turn on the transistors differently.

Transistor 832 of lower driver 830 may have a smaller value of $R_{DS-on}$ than transistor 834. To turn off lower driver 830, controller 812C may turn off transistor 832 first and quickly, while controller 812D may turn off transistor 834 more slowly. Finally, to turn on upper driver 820, controllers 812A and 812B may turn on transistors 822 and 824 either at the same time, or may turn them on differently. Note that although controllers 812A through 812D are shown as separate in FIG. 8, they need not be.

Although FIG. 8 shows transistors 822 and 824 both implemented as PMOS transistors and transistors 832 and 834 both implemented as NMOS transistors, other implementations are possible. For example, the implementation of FIG. 4 (and similar implementations) may be used to reduce or eliminate overshoot and undershoot as described above.

Figure 10:
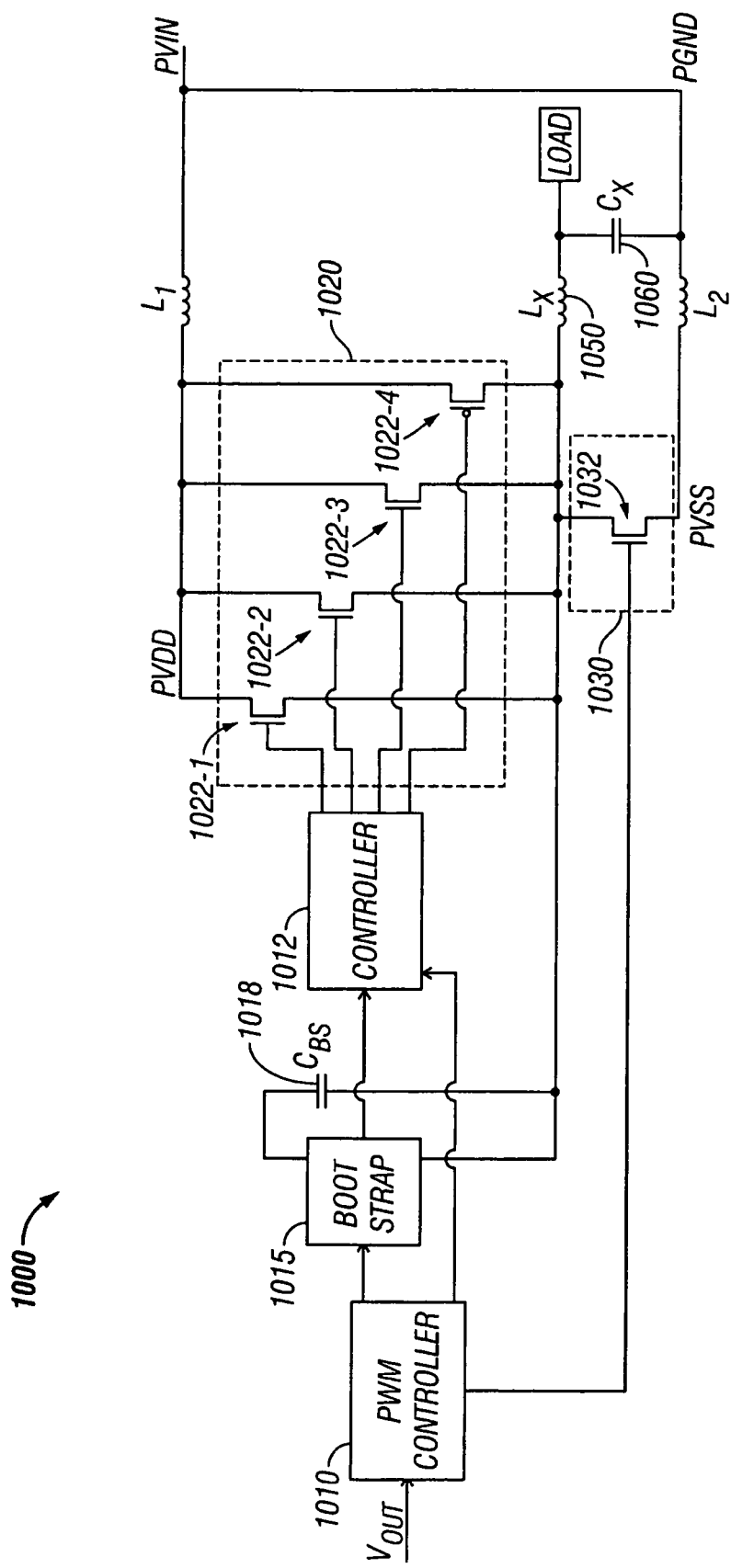
FIG. 10 shows an implementation of a DC/DC converter system including more than two transistors in an upper driver portion.

FIG. 10 shows an additional implementation of a system 1000 where more than two transistors may be used in an upper driver 1020 and/or a lower driver 1030. For example, upper driver 1020 includes M transistors 1022-1 through 1022-M, where transistors 1022-1 through 1022-(M-1) are NMOS transistors and transistor 1022-M is a PMOS transistor. Lower driver 1030 is shown as including one NMOS transistor 1032, although other implementations are possible.

A system such as system 1000 may be used as described above to increase the reliability of the system and to reduce or eliminate over- and under-shoot of PVDD and PVSS. For example, transistors 1022-1 through 1022-(M-1) may carry the bulk of the current during the time when upper driver 1020 is on. In order to turn off upper driver 1020, transistors 1022-1 through 1022-(M-1) may be turned off first. Transistor 1022-M may be subsequently turned off. In such an implementation, system 1000 may be more reliable (since PMOS transistor 1022-M has a higher on-state breakdown voltage than NMOS transistors 1022-1 through 1022-(M-1)), and may also be efficient (since NMOS transistors 1022-1 through 1022-(M-1) have a lower $R_{DS-on}$ than transistor 1022-M).

System 1000 may include a time and slew rate controller 1012 (which may comprise multiple controllers or a single controller) to control when and over what time scale transistors 1022-1 through 1022-M are turned on and off. In such an implementation, transistors 1022-1 through 1022-M may be turned on and off to reduce or eliminate over- and undershooting as described above with reference to FIGS. 8 and 9. For example, to turn off upper driver 1020, controller 1012 may turn off transistors 1022-1 through 1022-(M-1) quickly, then turn off transistor 1022-M slowly. Transistors 1022-1 through 1022-(M-1) may be turned off in sequence, or there may be some or complete overlap in the times over which they are turned off.

A number of implementations have been described. Nevertheless, it will be understood that various modifications may be made without departing from the spirit and scope of the invention. For example, different combinations of PMOS and NMOS transistors may be used. The power regulator systems (e.g., DC/DC converter systems) may include different numbers of transistors than those illustrated in the upper and/or lower drivers. Different types of switches may be used. For example, other types of transistors such as bipolar transistors may be used in some implementations. Accordingly, other implementations are within the scope of the following claims.

What is claimed is:

1. A power regulator, comprising:
a first driver including a first driver output, the first driver including a first switch with an output terminal in communication with the first driver output, the first driver further including a second switch with an output terminal in communication with the first driver output, wherein the first switch and the second switch are arranged in parallel, and an on-state breakdown voltage of the second switch is greater than an on-state breakdown voltage of the first switch, the first and second switches having different conductivity types; and
a second driver including a second driver output in communication with the first driver output.

2. The regulator of claim 1, wherein the first switch comprises a first transistor and the second switch comprises a second transistor.

3. The regulator of claim 2, wherein the first transistor comprises an NMOS transistor, and further including a bootstrap pre-driver in communication with a gate of the first transistor.

4. The regulator of claim 2, further including circuitry to turn off the first driver.

5. A power regulator, comprising:
a first driver including a first driver output, the first driver including a first switch comprising a first transistor with an output terminal in communication with the first driver output, the first driver further including a second switch comprising a second transistor with an output terminal in communication with the first driver output, wherein a power dissipation of the first switch is less than a power dissipation of the second switch, and the first and second switches are arranged in parallel and have different conductivity types;
a second driver including a second driver output in communication with the first driver output; and
circuitry to turn off the first driver by controlling a first turnoff initiation time and a first slew rate of a voltage applied to a gate of the first transistor, and further by controlling a second turnoff initiation time and a second slew rate of a voltage applied to a gate of the second transistor, wherein the second slew rate is different from the first slew rate.

6. The regulator of claim 5, wherein the circuitry controls the first turnoff initiation time to be before the second turnoff initiation time.

7. The regulator of claim 6, wherein the circuitry controls the first slew rate to be greater than the second slew rate.

8. The regulator of claim 7, wherein the circuitry further controls the first turnoff initiation time, the second turnoff initiation time, the first slew rate, and the second slew rate so that the first transistor is turned off prior to the second turnoff initiation time.

9. The regulator of claim 1, wherein the regulator is included in a direct current to direct current (DC/DC) converter.

10. The regulator of claim 1, further including a filter, the filter having an input in communication with the first driver output and the second driver output.

11. The regulator of claim 10, wherein the filter further includes an output in communications with a load.

12. The regulator of claim 1, wherein the first driver further includes one or more additional switches each having an output terminal in communication with the first driver output.

13. The regulator of claim 1, wherein the second driver includes one or more second driver switches each having an output terminal in communication with the second driver output.

14. The regulator of claim 13, wherein at least one of the one or more second driver switches comprises an NMOS transistor.

15. The regulator of claim 13, wherein the one or more second driver switches comprises a first transistor and a second transistor arranged in parallel and having different conductivity types, the first transistor having an on-state drain source resistance (RDS-on) value lower than an RDS-on value of the second transistor.

16. The regulator of claim 13, wherein the one or more second driver switches comprises a first transistor and a second transistor arranged in parallel and having different conductivity types, the first transistor having an on-state breakdown voltage lower than an on-state breakdown voltage of the second transistor.

17. A power regulator, comprising:
a first driving means including a first driver output means, the first driving means including a first switching means with an output means in communication with the first driver output means, the first driving means further including a second switching means with an output means in communication with the first driver output means, wherein a power dissipation of the first switching means is less than a power dissipation of the second switching means, the second switching means having an on-state breakdown voltage greater than an on-state breakdown voltage of the first switch, and the first and second switching means arranged in parallel and having different conductivity types; and
a second driving means including a second driver output means in communication with the first driver output means.

18. The power regulator of claim 17, wherein the first switching means comprises a first transistor and the second switching means comprises a second transistor.

19. The power regulator of claim 18, wherein an on-state drain source resistance ($R_{DS-on}$) of the first transistor is less than an $R_{DS-on}$ of the second transistor.

20. The power regulator of claim 18, wherein the first transistor comprises an NMOS transistor, and further including a bootstrap pre-driving means in communication with a gate of the first transistor.

21. The power regulator of claim 18, further including means for turning off the first driving means.

22. A power regulator, comprising:
a first driving means including a first driver output, the first driving means including a first switching means comprising a first transistor with an output terminal in communication with the first driver output, the first driving means further including a second switching means comprising a second transistor with an output terminal in communication with the first driver output, wherein a power dissipation of the first switching means is less than a power dissipation of the second switching means, and the first and second switching means are arranged in parallel and have different conductivity types;
a second driving means including a second driver output in communication with the first driver output; and
circuitry means for turning off the first driving means by controlling a first turnoff initiation time and a first slew rate of a voltage applied to a gate of the first transistor, and further by controlling a second turnoff initiation time and a second slew rate of a voltage applied to a gate of the second transistor, wherein the second slew rate is different from the first slew rate.

23. The power regulator of claim 22, wherein the means for turning off the first driving means is for controlling the first turnoff initiation time to be before the second turnoff initiation time.

24. The power regulator of claim 23, wherein the means for turning off the first driving means is for controlling the first slew rate to be greater than the second slew rate.

25. The power regulator of claim 24, wherein the means for turning off the first driving means is for controlling the first turnoff initiation time, the second turnoff initiation time, the first slew rate, and the second slew rate so that the first transistor is turned off prior to the second turnoff initiation time.

26. The power regulator of claim 17, wherein the power regulator is included in a direct current to direct current (DC/DC) conversion means.

27. The power regulator of claim 17, further including a filtering means, the filtering means having an input means in communication with the first driver output means and the second driver output means.

28. The power regulator of claim 27, wherein the filtering means further includes an output means in communication with a load.

29. The power regulator of claim 17, wherein the first driving means further includes one or more additional switching means each having an output means in communication with the first driver output means.

30. The power regulator of claim 17, wherein the second driving means includes one or more second driver switching means each having an output means in communication with the second driver output means.

31. The power regulator of claim 30, wherein at least one of the second driver switching means comprises an NMOS transistor.

32. The power regulator of claim 30, wherein the one or more second driver switching means comprises a first transistor and a second transistor arranged in parallel and having different conductivity types, the first transistor having an on-state drain source resistance (RDS-on) value lower than an RDS-on value of the second transistor 33. The power regulator of claim 30, wherein the one or more second driver switching means comprises a first transistor and a second transistor arranged in parallel and having different conductivity types, the first transistor having an on-state breakdown voltage lower than an on-state breakdown voltage of the second transistor.

34. A method for turning off a driver of a power regulator, comprising:
(A) turning off a first switch of the driver, the first switch having a lower power dissipation in an on-state than a second switch of the driver, wherein an on-state breakdown voltage of the second switch is greater than an on-state breakdown voltage of the first switch, and the first and second switches are arranged in parallel and have different conductivity types; and (B) after (A), turning off the second switch of the driver.

35. The method of claim 34, wherein the first switch comprises a first transistor, and wherein turning off the first switch of the driver comprises modifying a voltage applied to a gate of the first transistor from an on voltage at which the first transistor is on to an off voltage at which the first transistor is off.

36. The method of claim 35, wherein modifying the voltage applied to the gate of the first transistor is performed over a time equal to a first transistor turn off time.

37. The method of claim 36, wherein the second switch comprises a second transistor, and wherein turning off the second switch of the driver comprises modifying a voltage applied to a gate of the second transistor from an on voltage at which the second transistor is on to an off voltage at which the second transistor is off.

38. The method of claim 37, wherein modifying the voltage applied to the gate of the second transistor is performed over a time equal to a second transistor turn off time.

39. The method of claim 38, wherein the second transistor turn off time is greater than the first transistor turn off time.

40. The method of claim 39, wherein the second transistor turn off time is at least two times as long as the first transistor turn off time.

41. The method of claim 34, further comprising;

(C) after (B), turning on a different driver.

42. The method of claim 41, wherein turning on the different driver comprises turning on one or more switches included in the different driver.

43. The method of claim 42, wherein the one or more switches included in the different driver are implemented as transistors, and wherein turning on the one or more switches included in the different driver comprises applying a turn-on voltage to a gate of each of the one or more switches.

44. The method of claim 41, further comprising:

(D) after (C), turning off the different driver.

45. The method of claim 44, wherein the different driver comprises a first transistor and a second transistor, and wherein (D) comprises turning off the first transistor prior to turning off the second transistor.

46. The method of claim 45, wherein the first transistor has a lower power dissipation in an on-state than the second transistor.

47. A power regulator, comprising:

a first driver including a first driver output, the first driver including a first switch with an output terminal in communication with the first driver output, the first driver further including a second switch with an output terminal in communication with the first driver output, wherein the first and second switches arranged in parallel and having different conductivity types;

a second driver including a second driver output in communication with the first driver output; and circuitry to turn off the first driver, wherein the first switch comprises a first transistor and the second switch comprises a second transistor, the circuitry is to turn off the first driver by controlling a first turnoff initiation time and a first slew rate of a voltage applied to a gate of the first transistor, and further by controlling a second turnoff initiation time and a second slew rate of a voltage applied to a gate of the second transistor, wherein the second slew rate is different from the first slew rate.

48. The regulator of claim 47, wherein the circuitry controls the first turn off initiation time to be before the second turnoff initiation time.

49. The regulator of claim 48, wherein the circuitry controls the first slew rate to be greater than the second slew rate.

50. The regulator of claim 49, wherein the circuitry further controls the first turnoff initiation time, the second turnoff initiation time, the first slew rate, and the second slew rate so that the first transistor is turned off prior to the second turnoff initiation time.

51. A power regulator, comprising:

a first driver including a first driver output, the first driver including at least a first switch comprising a first transistor with an output terminal in communication with the first driver output and a second switch comprising a second transistor with an output terminal in communication with the first driver output, wherein a power dissipation of the first switch is less than a power dissipation of the second switch, and the first and second switches are arranged in parallel and have different conductivity types;

a second driver including a second driver output in communication with the first driver output, the second driver including at least a third switch comprising a first transistor with an output terminal in communication with the second driver output and a fourth switch comprising a second transistor with an output terminal in communication with the second driver output;

circuitry to turn off the first driver by controlling a first turnoff initiation time and a first slew rate of a voltage applied to a gate of the first transistor, and further by controlling a second turnoff initiation time and a second slew rate of a voltage applied to a gate of the second transistor, wherein the second slew rate of a voltage applied to the gate of the second transistor is different from the first slew rate of a voltage applied to the gate of the first transistor; and circuitry to turn off the second driver by controlling a first turnoff initiation time and a first slew rate of a voltage applied to a gate of the third transistor, and further by controlling a second turnoff initiation time and a second slew rate of a voltage applied to a gate of the fourth transistor, wherein the second slew rate of a voltage applied to the gate of the fourth transistor is different from the first slew rate of the third transistor.

52. The regulator of claim 51, wherein the first driver further comprises one or more additional switches having at least an output terminal in communication with the first driver output, and the second driver further comprises one or more additional switches having at least an output terminal in communication with the second driver output.

53. A power regulator, comprising:

a first driver including a first driver output, the first driver including

N switches arranged in parallel with output terminals in communication with the first driver output, wherein i of the N switches having a first conductivity type and j of the N switches having a second conductivity type different from the first conductivity type, wherein N is greater than two; and a second driver including a second driver output in communication with the first driver output.

54. A power regulator, comprising:

a first driver including a first driver output, the first driver including

N switches arranged in parallel with output terminals in communication with the first driver output,
wherein i of the N switches having a first conductivity type and j of the N switches having a second conductivity type different from the first conductivity type,
wherein N is greater than two,
the first driver further including
a bootstrap pre-driver in communication with at least i of the N switches; and
a second driver including a second driver output in communication with the first driver output.

55. A power regulator, comprising:
a first driving means including a first driver output means, the first driving means including
N switching means arranged in parallel with output means in communication with the first driver output means,
wherein i of the N switching means having a first conductivity type and j of the N switching means having a second conductivity type different from the first conductivity type,
wherein N is greater than two; and
a second driving means including a second driver output means in communication with the first driver output means.

56. A power regulator, comprising:
a first driving means including a first driver output means, the first driving means including
N switching means arranged in parallel with an output means in communication with the first driver output means,
wherein i of the N switching means having a first conductivity type and j of the N switching means having a second conductivity type different from the first conductivity type,
wherein N is greater than two,
the first driving means further including
a bootstrap pre-driving means in communication with at least i of the N switching means; and
a second driving means including a second driver output means in communication with the first driver output means.

57. The power regulator of claim 1, wherein a power dissipation of the first switch is less than a power dissipation of the second switch.

* * * * *